US012664857B2

(12) United States Patent
Connelly et al.

(10) Patent No.: US 12,664,857 B2
(45) Date of Patent: Jun. 23, 2026

(54) LIVE ELECTRONIC TABLE GAME CASINO PIT WITH HYBRID DEALER ASSISTANCE

(71) Applicant: Interblock d.o.o., Menges (SI)

(72) Inventors: John Joseph Connelly, Las Vegas, NV (US); Jeffrey Kowalchuk, Las Vegas, NV (US)

(73) Assignee: INTERBLOCK D.O.O., Las Vegas, NV (US)

( * ) Notice: Subject to any disclaimer, the term of this patent is extended or adjusted under 35 U.S.C. 154(b) by 226 days.

(21) Appl. No.: 18/390,156

(22) Filed: Dec. 20, 2023

(65) Prior Publication Data

US 2025/0005996 A1 Jan. 2, 2025

Related U.S. Application Data

(60) Provisional application No. 63/510,876, filed on Jun. 28, 2023.

(51) Int. Cl.
*G07F 17/32* (2006.01)

(52) U.S. Cl.
CPC ........ *G07F 17/322* (2013.01); *G07F 17/3209* (2013.01); *G07F 17/3211* (2013.01); *G07F 17/3288* (2013.01); *G07F 17/3241* (2013.01)

(58) Field of Classification Search
None
See application file for complete search history.

(56) References Cited

U.S. PATENT DOCUMENTS 8,087,983 B2 1/2012 Longway
10,055,931 B2 8/2018 Greenbaum et al.
10,672,223 B2 6/2020 Bergant
10,818,127 B2 10/2020 Greenbaum et al.
11,468,728 B2 10/2022 Greenbaum et al.
(Continued)

FOREIGN PATENT DOCUMENTS

CN 101229433 A 7/2008
CN 107408323 A 11/2017
(Continued)

OTHER PUBLICATIONS

U.S. Appl. No. 18/390,086, filed Dec. 20, 2023, Connelly.
(Continued)

*Primary Examiner* — Ronald Laneau
(74) *Attorney, Agent, or Firm* — BakerHostetler

(57) ABSTRACT

The present disclosure relates to systems and methods for a live electronic table game (ETG) pit that comprises a plurality of live ETGs arranged on a casino floor in a pit having an interior area and a perimeter, each live ETG having a physical game component involving one or more of a physical card, a physical ball, and a physical die, wherein at least part of each game played on each live ETG involves the physical game component, a community display, and at least one dealer console for enabling a dealer to manage various aspects of each game; and one or more player consoles physically arranged around each of the plurality of live ETGs, each of the player consoles physically arranged around a live ETG having a graphical user interface for enabling a player to enter bets associated with each game to be played on the live ETG and to resolve the bets based on a result of each game.

20 Claims, 7 Drawing Sheets

(56) References Cited

U.S. PATENT DOCUMENTS

| | | | | |
|---|---|---|---|---|
| 2007/0111775 | A1 | 5/2007 | Yoseloff | |
| 2008/0194310 | A1 | 8/2008 | Yoshizawa | |
| 2009/0054159 | A1 | 2/2009 | Gadda et al. | |
| 2009/0176547 | A1 | 7/2009 | Katz | |
| 2013/0053116 | A1 | 2/2013 | Haushalter | |
| 2013/0316775 | A1 | 11/2013 | Haushalter | |
| 2015/0297982 | A1 | 10/2015 | Ogilvie et al. | |
| 2015/0343315 | A1 | 12/2015 | Gadda et al. | |
| 2017/0092037 | A1* | 3/2017 | Snow | G07F 17/3244 |
| 2017/0178441 | A1 | 6/2017 | Chun | |
| 2019/0164387 | A1 | 5/2019 | Dobrosevic | |
| 2023/0124919 | A1 | 4/2023 | Yee et al. | |
| 2025/0005996 | A1* | 1/2025 | Connelly | G07F 17/3288 |
| 2025/0118134 | A1* | 4/2025 | Connelly | G07F 17/3288 |
| 2025/0118147 | A1* | 4/2025 | Connelly | G07F 17/322 |
| 2025/0118166 | A1* | 4/2025 | Connelly | G07F 17/3269 |

FOREIGN PATENT DOCUMENTS

| | | | |
|---|---|---|---|
| CN | 111508165 | A | 8/2020 |
| CN | 113168665 | A | 7/2021 |
| CN | 113870494 | A | 12/2021 |
| TW | 200902126 | A | 1/2009 |
| TW | 202317240 | A | 5/2023 |

OTHER PUBLICATIONS

U.S. Appl. No. 18/390,109, filed Dec. 20, 2023, Connelly.

International Patent Application No. PCT/US2023/085638; Written Opinion; dated Aug. 26, 2025; 5 pages.

"Interblock to present the Future of Table Games at ICE London 2023"; Interblock Luxury Gaming Products; Jan. 2023; 4 pages.

S. Roeben; "Deep Dive: Hybrid Stadium Craps Rolls Into Downtown Grand"; https://www.casino.org/vitalvegas/hybrid-stadium-craps-rolls-into-downtown-grand/; Vital Vegas; Feb. 2023; 28 pages.

"Luxury Gaming Products"; https://interblockgaming.com; Interblock Luxury Gaming Products; © 2025; 24 pages.

International Patent Application No. PCT/US2023/085638; Int'l Search Report and the Written Opinion; dated Apr. 15, 2024; 13 pages.

International Patent Application No. PCT/US2023/085638; Int'l Written Opinion; dated Dec. 4, 2025; 5 pages.

International Patent Application No. PCT/US2023/085638; Int'l Preliminary Report on Patentability; dated Jan. 13, 2026; 18 pages.

* cited by examiner

FIG. 10
$514.00
Audit mode
HELP
SUPER SPIN
5
23
11
5
3

LIVE ELECTRONIC TABLE GAME CASINO PIT WITH HYBRID DEALER ASSISTANCE

CROSS-REFERENCE TO RELATED APPLICATIONS

The present application claims a right to priority to U.S. Patent Application No. 63/510,876, filed Jun. 28, 2023, the entirety of which is incorporated by reference herein.

TECHNICAL FIELD

The present disclosure relates generally, but not exclusively, to the field of gaming, particularly electronic table games and casino pits.

BACKGROUND INFORMATION

Casinos offer a variety of games to attract players. Such games may include live table games (e.g., roulette, craps, blackjack, etc.), virtual games, physical machines (e.g., slot-like machines and electronic table games), individual player machines, stadium-style group stations, and various gameplay combinations. Traditionally, casinos are organized to have pit areas and slot areas. FIG. 1 illustrates a typical pit area 10 with one or more craps tables 12, one or more roulette tables 14, one or more baccarat tables (not shown), and numerous blackjack tables 16 arranged in a rectangle so that dealers and supervisors are within a central internal area of the rectangle and players are arranged around the outside of the rectangle.

Traditional craps tables have a player to dealer ratio of 12:3 or 12:4, with one boxman and three to four dealers. The boxman is more senior than the dealers in terms of experience and is in charge of the game. The dealers take turns being the stickman, i.e., the dealer that uses a curved stick to collect the dice after a throw, with the other dealers helping to place, collect losses and pay wins. Two to three dealers work the table at a time with one additional dealer on a rotational break. Due to the complexity of the game, the dealers require a higher degree of skill than in certain other games.

Traditional roulette tables and baccarat tables require a higher degree of skill for the dealers, although only one dealer is required at a time. In roulette, the player to dealer ratio is typically 5:1 or 6:1 and in baccarat the player to dealer ratio is typically 6:1. Blackjack requires less dealer skill than other table games and also has a player to dealer ratio of 5:1 or 6:1. Despite the level of skill required of the dealers, all of the live table games experience losses on a daily basis as a result of payout errors, such as where a losing bet is accidentally paid out or more is paid on a winning bet than should have been paid.

SUMMARY

An embodiment is directed to a live electronic table game (ETG) pit that comprises a plurality of live ETGs arranged on a casino floor in a pit having an interior area and a perimeter, each live ETG having a physical game component involving one or more of a physical card, a physical ball, and a physical die, wherein at least part of each game played on each live ETG involves the physical game component, a community display, and at least one dealer console for enabling a dealer to manage various aspects of each game; and one or more player consoles physically arranged around each of the plurality of live ETGs, each of the player consoles physically arranged around a live ETG having a graphical user interface for enabling a player to enter bets associated with each game to be played on the live ETG and to resolve the bets based on a result of each game.

These and other features will be more clearly understood from the following detailed description taken in conjunction with the accompanying drawings and claims. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EMBODIMENTS

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
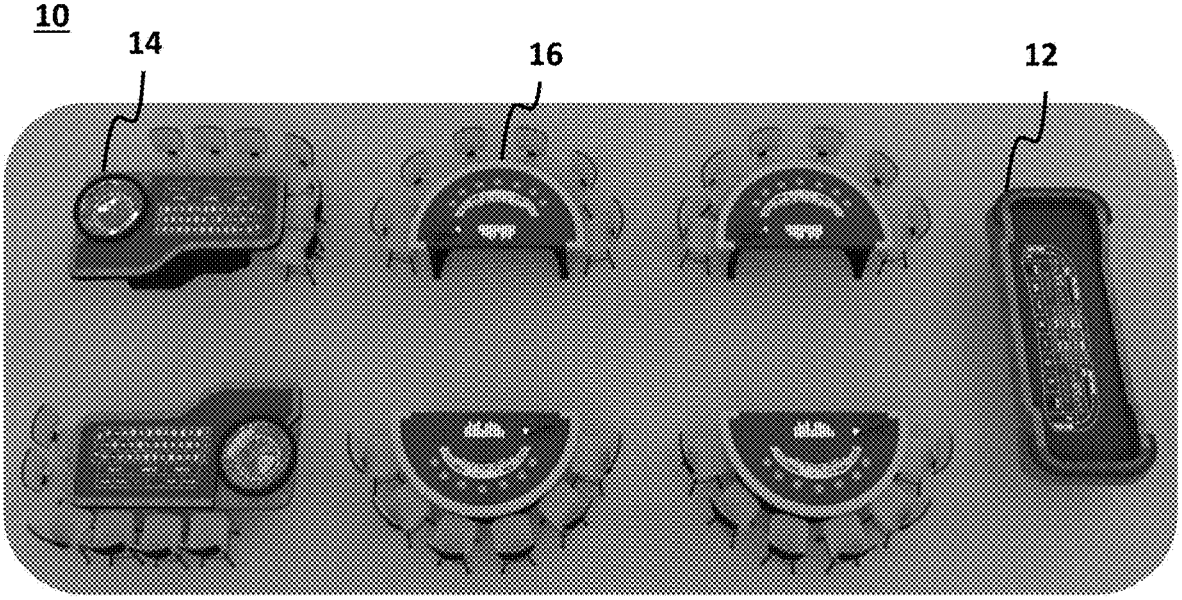
FIG. 1 (PRIOR ART)
FIG. 1 is a perspective view of a prior art casino pit including a live craps table, two live roulette tables and four live blackjack tables all arranged in a rectangle.
Figure 2:
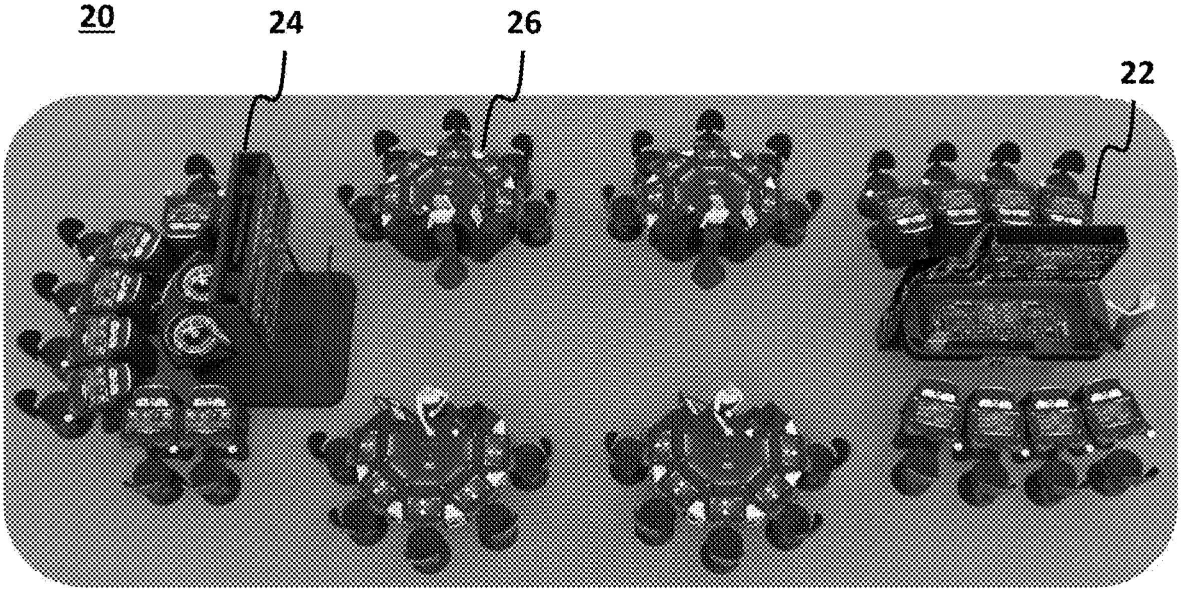
FIG. 2 is perspective view of a live electronic table game casino pit, in accordance with an embodiment.

Disclosed herein are methods, systems, and computer readable storage media that provide a live electronic table game (ETG) casino pit with hybrid dealer assistance. As illustrated in FIG. 2, a live ETG casino pit 20 may involve a live ETG craps game 22, a live ETG roulette game 24, and a plurality of live ETG blackjack games 26. As can be seen by comparing FIG. 2 to FIG. 1, the live ETG casino pit 20 is arranged similarly to a traditional casino pit, with dealers largely positioned within an internal area and players arranged around a perimeter of the live ETG casino pit, and occupies approximately the same physical space as the casino pit 10 but as further explained herein requires significantly fewer dealers and has other advantages over casino pit 10.

Figure 3:
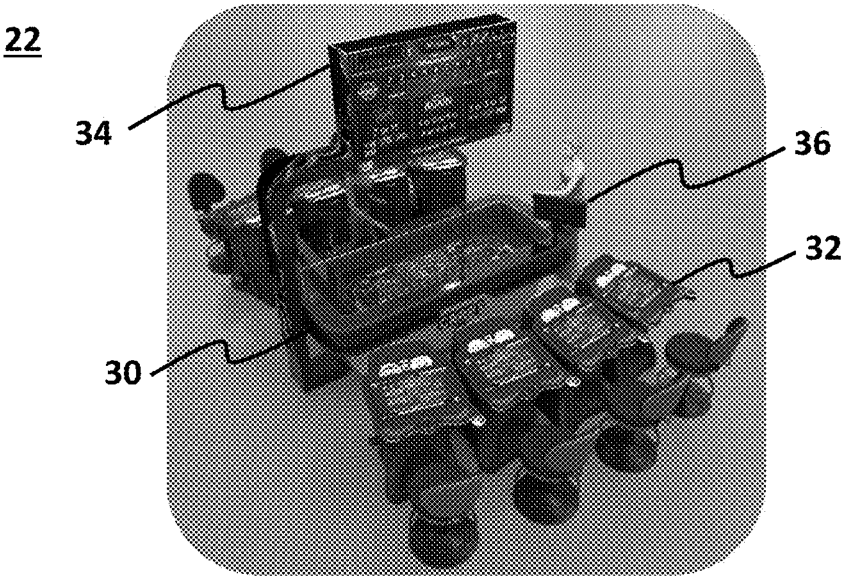
FIG. 3 is a perspective view of an example live craps electronic table game, in accordance with an embodiment.

FIG. 3 provides a further illustration of the live ETG craps game 22. The craps game 22 may be configured to position the players off the craps table 30 at their own player consoles 32 for better security. As illustrated in FIG. 3, the craps game 22, which may have a traditional felt surface that craps players prefer, is configured in a dual configuration that has four player consoles 32 on one side of the craps table 30 and four player consoles on an opposite side of the craps table 30. In a dual configuration, the game display 34 has displays on both sides of the craps table 30 and a dealer with a dealer console 36 on both sides of the craps table 30. In a singular configuration, the display 34 would only have a display on the side of the craps table 30 facing the player consoles 32 and only one dealer at a dealer console 36. The craps game 22 may also be configured in a stand-alone configuration that only has a single player console 32 at a craps table 30 or in a stadium configuration with numerous player consoles arranged in semi-circles around the craps table 30, similar to the stadium configurations shown in FIGS. 7 and 8.

The craps game 22 may utilize three cameras either incorporated either incorporated into the display 34 or the craps table 30, or both, that are separately focused on the shooter, the landing area, and the final dice result area so that players and spectators can more readily follow the game. The cameras may also enable a multi-step result entry process for confirming the winning number, which may occur only after the result is displayed on the display 34 via a camera to all players, spectators and security surveillance. The game table 30 may also include a capacitive sensor area, such as those disclosed in U.S. Pat. No. 10,672,223, which is incorporated in whole by reference, that makes it possible to ensure that all bets are closed automatically when the dealer removes the dice from a dice holding area.

Some of the advantages that the live ETG craps game 22 has over a traditional live craps game is that it saves the casino labor costs. The number of dealers required to run a game can be reduced from three to four dealers for a single table to only one dealer. This makes it possible for casinos to offer a live craps game experience at an affordable price of entry, especially during slower gaming periods, such as 2 am to 2 pm. At the same time, the level of skill required for the dealer can be significantly lower, since payouts for winning bets are calculated and paid by the player consoles 32 instead of the dealer, resulting in lower compensation costs for the dealers that are utilized. For traditional live craps games that cost an average of $100/hour, the cost can be reduced to about $34/hour. For casinos operating at least one live craps game 24 hours a day, each traditional live craps table replaced by a live ETG craps game 22, saves the casino over $500,00/game. As the dealer is not required to pay strict attention to the game and the players grouped around the table, as is the case with traditional live craps, the dealer can also operate other games at the same time as further discussed herein. Lastly, the live ETG craps game 22 enables the casino to significantly increase the player to dealer ratio from 3:1 (12:4) or lower to 4:1, 8:1, 12:1 or more.

Figure 4:
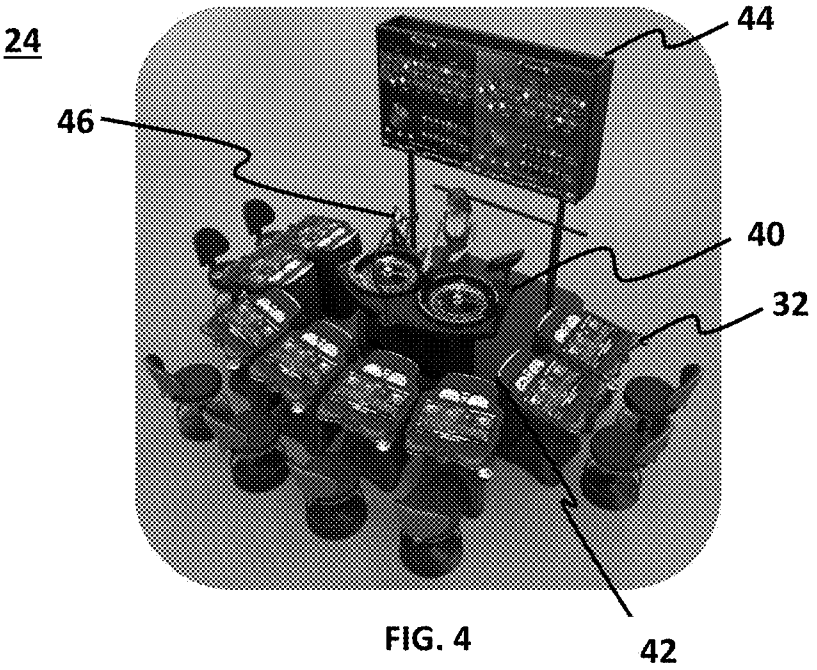
FIG. 4 is a perspective view of an example live roulette electronic table game, in accordance with an embodiment.

FIG. 4 provides a further illustration of the live ETG roulette game 24. The roulette game 24 includes two roulette wheels 40 with their own random number generators 42 underneath (or remotely located), a display 44 for displaying the results for both roulette wheels 40, a single dealer with a dealer console 46, and a plurality of player consoles 32. The display 44 is divided between the two roulette wheels 40, one side one color and one side a different color so players can readily tell them apart. Synchronization between the two roulette wheels 40 may be controlled by the dealer console 44 or automatically controller by the random number generators 42. The dual roulette wheels 40, combined with the player consoles 32 automatically settling bets in place of the dealer, results in three to four times more game results per hour with virtually zero payout errors. The fact that one dealer can deal more live roulette to any number of players greatly increases revenue, while the increase in player to dealer ratio, eliminating 1-2 full-time equivalent (FTE) employees, and reducing the compensation cost associated with only needing less skilled dealers, greatly enhances profitability.

Figure 5:
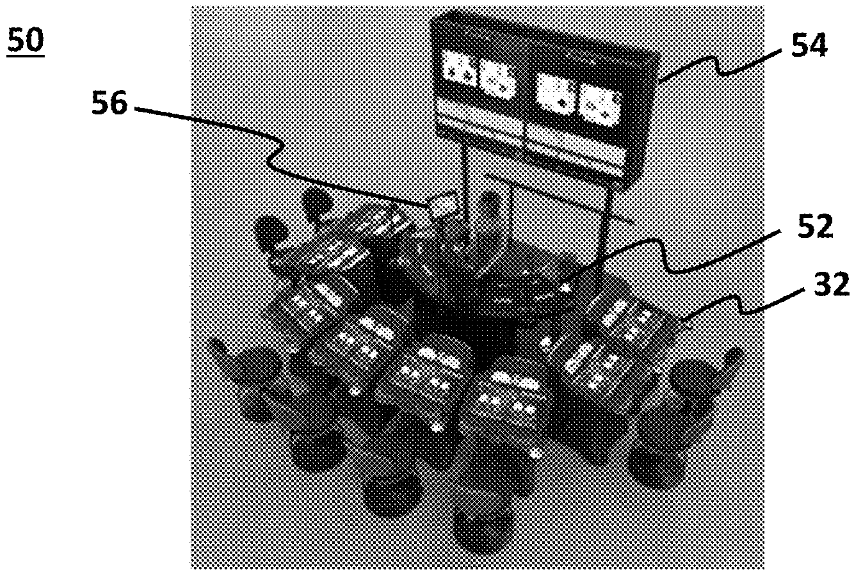
FIG. 5 is a perspective view of an example live baccarat electronic table game, in accordance with an embodiment.

FIG. 5 provides an illustration of a live ETG baccarat game 50. Like the roulette game 24, the baccarat game 50 includes two card shoes 52 for two different hands of baccarat, a display 54 for displaying the results for both card shoes 50, a single dealer with a dealer console 56, and a plurality of player consoles 32. The display 54 is divided between the two card shoes 50, one side one color and one side a different color so players can readily tell them apart. The single dealer can deal the two shoes sequentially, resulting in more hands and more income per hour. The shoes may be shuffled by the dealer, an auto shuffler, or be served by a random generator shoe. The baccarat game options include traditional 5% commission, or no-commission baccarat with a variety of side bets through the graphical user interface of the player consoles, such as lucky nines, any pair, Hi-Ti and super 6. The dual shoes 50, combined with the player consoles 32 automatically settling bets in place of the dealer, results in more game results per hour with virtually zero payout errors. The fact that one dealer can deal up to two times more live baccarat to any number of players greatly increases revenue, while the increase in player to dealer ratio, eliminating 1-2 full-time equivalent (FTE) employees, and reducing the compensation cost associated with only needing less skilled dealers, greatly enhances profitability.

Figure 6A:
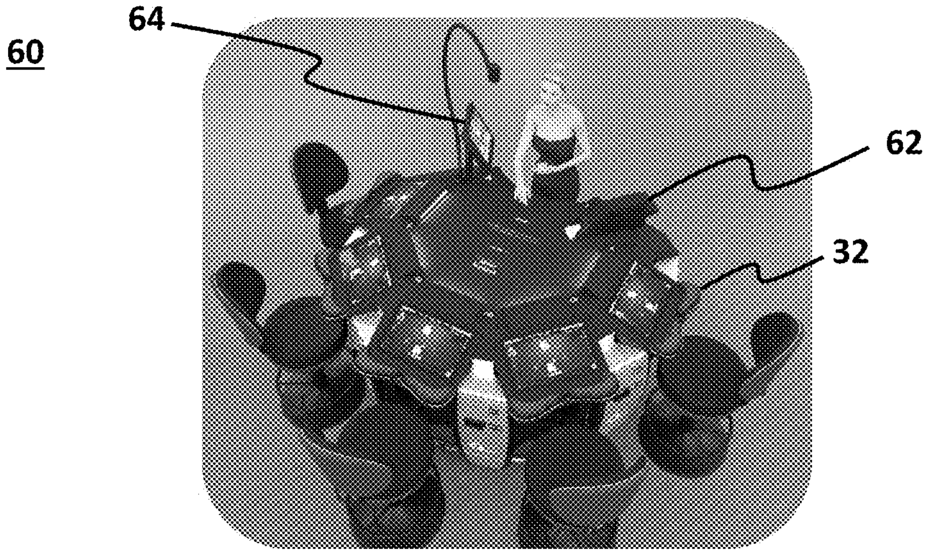
FIG. 6A is a perspective view of an example live blackjack electronic table game, in accordance with an embodiment.
Figure 6B:
FIG. 6B is a display view of an example graphical user interface for the live blackjack electronic table game of FIG. 6A illustrating side bets.

FIG. 6A provides an illustration of a live ETG blackjack game 60. The blackjack game 60 includes a shoe 62, as in the baccarat game 50 and a single dealer with a dealer console 64. Unlike a traditional blackjack table, the dealer does not actually deal the cards directly in front of the players where they can touch the cards. Rather, the cards are dealt to spots corresponding to each player console 32 and the dealt cards are detected and displayed on the display of the player console 32. Rather than scrape the cards on the table to indicate a hit or tap the table to indicate a stay, the player can make such indications on their display. This allows each game to progress more quickly resulting in more hands and therefore more income per hour along with zero payout errors as a result of the player consoles automatically settling each bet. The graphical user interface 66 of the player console 32, as illustrated in FIG. 6B, may also enable the player to play any of a number of different side bets associated with each blackjack hand played.

Figure 7:
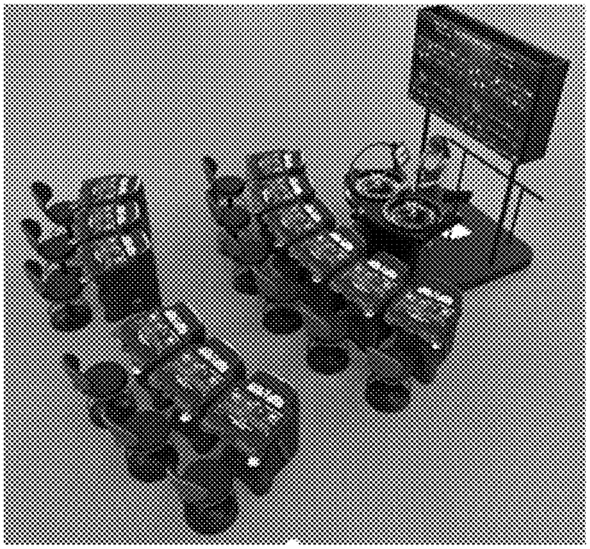
FIG. 7 is a perspective view of an example live roulette electronic table game in a stadium configuration, in accordance with an embodiment.
Figure 8:
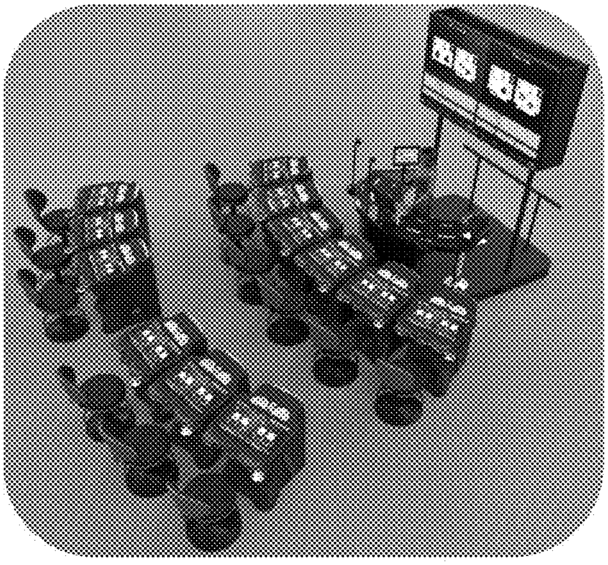
FIG. 8 is a perspective view of an example live baccarat electronic table game in a stadium configuration, in accordance with an embodiment.
Figure 9:
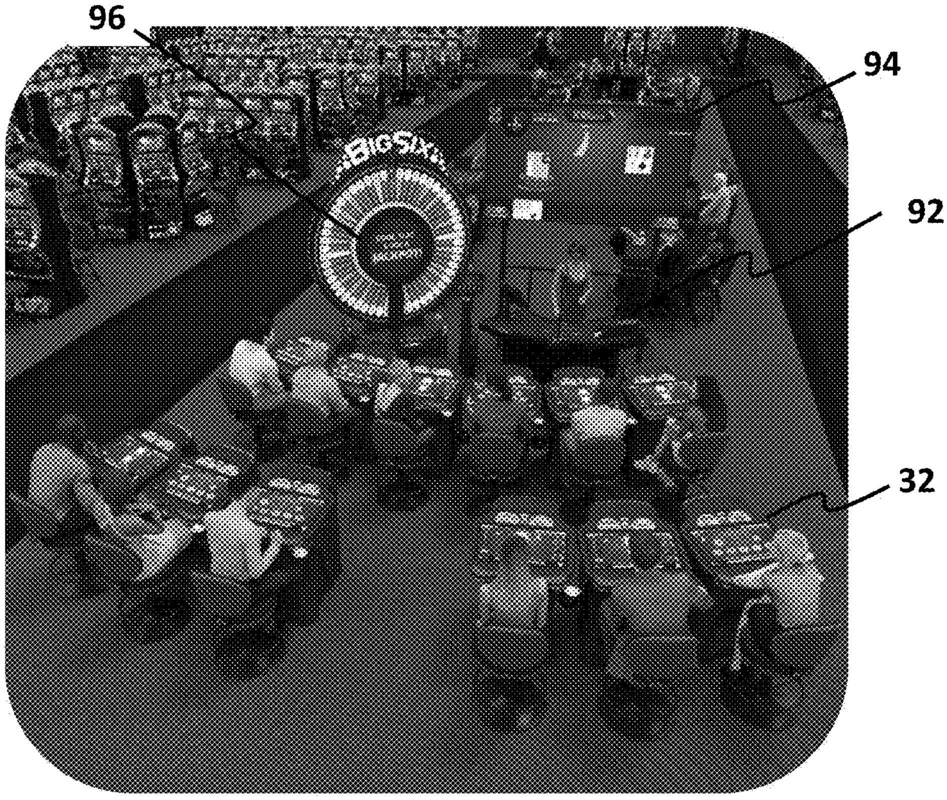
FIG. 9 is a perspective view of an example live blackjack electronic table game combined with a big wheel electronic table game, in accordance with an embodiment.
Figure 10:
FIG. 10 is a display view of an example graphical user interface for the combination illustrated in FIG. 9.

FIG. 7 and FIG. 8 illustrate stadium configurations of player consoles for a live ETG roulette game and a live ETG baccarat game, respectively. FIG. 9 also illustrates a plurality of player consoles 32 in a stadium configuration for a live ETG blackjack game 92 combined with a different game that is controlled by the same dealer. The display 94 from the blackjack game 92 also provides the results of the live ETG big wheel game 96. FIG. 10 illustrates a graphical user interface 1000 of a player console 32 that illustrates the inputs (e.g., main bets, side bets, etc.), options (e.g., minimum bet settings, bet timers, etc.) and results for the blackjack game 92 on the right and the big wheel game 96 on the left.

The ability to offer completely different live ETG games on the same game display, such as display 94, or the same player console 32, opens some other unique opportunities. As illustrated in FIGS. 9 and 10, the live ETG games may be physically located in the same area of the casino floor such that they may share the same display 94. However, it is also possible that the player console 32 could play a single live ETG that is physically located near the player console 32 as well as one or more other live ETG games and are not located near the player console 32. For example, referring to FIG. 2, a player at a player console 32 near the live ETG craps game 22 may be able to simultaneously play hands at one of the live ETG blackjack games 26 and/or live ETG roulette game 24, or even games further remote to the live ETG casino pit 20 as well as other games, such as slot machines that are in a different part of the casino or even located elsewhere as described in U.S. Provisional Patent Application Nos. 63/502,811 and 63/588,899 which are incorporated in whole by reference.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 11:
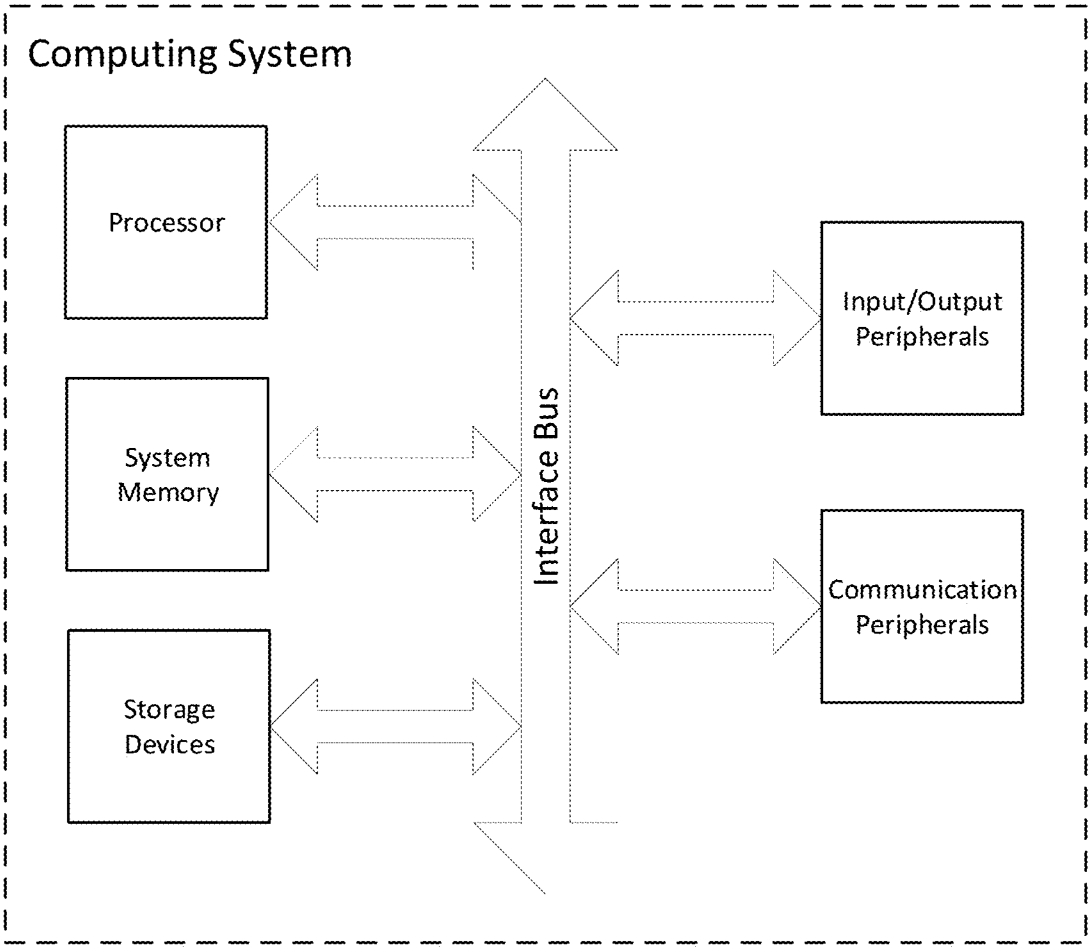
FIG. 11 is an illustration of an exemplary block diagram representing a general-purpose computer system in which aspects of the methods and systems disclosed herein or portions thereof may be incorporated.

The techniques described above can be implemented on a computing device associated with a gaming device (e.g., a roulette machine operating a live roulette game), a plurality of computing devices associated with a plurality of gaming devices, a controller in communication with the gaming device(s) (e.g., a controller configured to synchronize the gaming devices(s)), or a plurality of controllers in communication with the gaming device(s). Additionally, the techniques may be distributed between the computing device(s) and the controller(s). FIG. 11 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the roulette wheel velocity adjustments and result detection optimization, as described above. The computing system components may be present in the gaming device, in a server or other component of a network, or distributed between some combinations of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, and velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile, or non-volatile storage.

In an embodiment, a live electronic table game (ETG) pit comprises a plurality of live ETGs arranged on a casino floor in a pit having an interior area and a perimeter, each live ETG having a physical game component involving one or more of a physical card, a physical ball, and a physical die, wherein at least part of each game played on each live ETG involves the physical game component, a community display, and at least one dealer console for enabling a dealer to manage various aspects of each game; and one or more player consoles physically arranged around each of the plurality of live ETGs, each of the player consoles physically arranged around a live ETG having a graphical user interface for enabling a player to enter bets associated with each game to be played on the live ETG and to resolve the bets based on a result of each game.

In the embodiment, wherein the plurality of live ETGs include a live ETG craps game having a physical craps table upon which a player of a player console acting as a shooter throws dice to determine the result of a craps game, wherein when the live ETG craps game is configured in a single side mode there is a single dealer console for a single dealer on one side of the community display.

In the embodiment, wherein the plurality of live ETGs include a live ETG craps game having a physical craps table upon which a player of a player console acting as a shooter throws dice to determine the result of a craps game, and wherein when the live ETG craps game is configured in a dual side more there is one dealer console for a first dealer on the one side of the community display and a second dealer console for a second dealer on an opposite side of the community display.

In the embodiment, wherein the plurality of live ETGs include a live ETG roulette game having a first physical roulette wheel with a single dealer console for a single dealer and with the result of the first physical roulette wheel being displayed on a first side of the community display.

In the embodiment, wherein the live ETG roulette game includes a second physical roulette wheel with the result of the first physical roulette wheel being displayed on one side of the first side of the community display and the result of the second physical roulette wheel being displayed on another side of the first side of the community display.

In the embodiment, wherein the first physical roulette wheel and the second physical roulette wheel are operated sequentially.

In the embodiment, wherein the plurality of live ETGs include a live ETG baccarat game having a first physical card shoe with a single dealer console for a single dealer and with the result of hands from the first card shoe being displayed on a first side of the community display.

In the embodiment, wherein the live ETG baccarat game includes a second physical card shoe with the result of hands from the first physical card shoe being displayed on one side of the first side of the community display and the result of hands from the second physical card shoe being displayed on another side of the first side of the community display.

In the embodiment, wherein the hands from the first card shoe and the hands from the second physical card shoe are dealt sequentially.

In the embodiment, wherein the plurality of live ETGs include a live ETG blackjack game have a physical card shoe with a single dealer console for a single dealer and the results of hands from the first card shoe being displayed on a first side of the community display.

In the embodiment, wherein displays of the player consoles are positioned between players and the single dealer such that the players cannot touch cards from the hands from the first card shoe as they are dealt.

In the embodiment, wherein the cards from the hands are dealt to areas on the live ETG blackjack game that correspond to each player among the players, wherein sensors in the areas read the cards and cause the cards to be displayed on the community display.

In the embodiment, wherein each of the displays of the player consoles include a graphical user interface that enables each player to place main game bets, see their cards and the single dealer's cards, place side bets, and resolve the results of each hand.

In the embodiment, wherein the one or more player consoles includes a plurality of player consoles arranged around one live ETG among of the plurality of live ETGs.

In the embodiment, wherein the plurality of player consoles are arranged around the one live ETG in a stadium configuration.

In the embodiment, wherein the one or more player consoles enable each player to play on two or more live ETGs at the same time.

In the embodiment, wherein the two or more live ETGs are physically located near the one or more player consoles.

In the embodiment, wherein one live ETG among the two or more live ETGs is physically located near the one or more player consoles and one or more live ETGs among the two or more live ETGs are remotely located.

In the embodiment, wherein at least one live ETG among the one or more live ETGs are in the live ETG pit.

In an embodiment, a method for providing a live electronic table game (ETG) pit, comprises: providing a plurality of live ETGs on a casino floor in a pit having an interior area and a perimeter, each live ETG having a physical game component involving one or more of a physical card, a physical ball, and a physical die, wherein at least part of each game played on each live ETG involves the physical game component, a community display, and at least one dealer console for enabling a dealer to manage various aspects of each game; and providing one or more player consoles around each of the plurality of live ETGs, each of the player consoles physically arranged around a live ETG having a graphical user interface for enabling a player to enter bets associated with each game to be played on the live ETG and to resolve the bets based on a result of each game.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A live electronic table game (ETG) pit, comprising:

a plurality of live ETGs arranged on a casino floor in a pit having an interior area and a perimeter, each live ETG having a physical game component involving one or more of a physical card, a physical ball, and a physical die, wherein at least part of each game played on each live ETG involves the physical game component, a community display, and at least one dealer console for enabling a dealer to manage various aspects of each game; and one or more player consoles physically arranged around each of the plurality of live ETGs, each of the player consoles physically arranged around a live ETG having a graphical user interface for enabling a player to enter bets associated with each game to be played on the live ETG and to resolve the bets based on a result of each game.

2. The live ETG pit of claim 1, wherein the plurality of live ETGs include a live ETG craps game having a physical craps table upon which a player of a player console acting as a shooter throws dice to determine the result of a craps game, wherein when the live ETG craps game is configured in a single side mode there is a single dealer console for a single dealer on one side of the community display.

3. The live ETG pit of claim 1, wherein the plurality of live ETGs include a live ETG craps game having a physical craps table upon which a player of a player console acting as a shooter throws dice to determine the result of a craps game, and wherein when the live ETG craps game is configured in a dual side more there is one dealer console for a first dealer on the one side of the community display and a second dealer console for a second dealer on an opposite side of the community display.

4. The live ETG pit of claim 1, wherein the plurality of live ETGs include a live ETG roulette game having a first physical roulette wheel with a single dealer console for a single dealer and with the result of the first physical roulette wheel being displayed on a first side of the community display.

5. The live ETG pit of claim 4, wherein the live ETG roulette game includes a second physical roulette wheel with the result of the first physical roulette wheel being displayed on one side of the first side of the community display and the result of the second physical roulette wheel being displayed on another side of the first side of the community display.

6. The live ETG pit of claim 5, wherein the first physical roulette wheel and the second physical roulette wheel are operated sequentially.

7. The live ETG pit of claim 1, wherein the plurality of live ETGs include a live ETG baccarat game having a first physical card shoe with a single dealer console for a single dealer and with the result of hands from the first card shoe being displayed on a first side of the community display.

8. The live ETG pit of claim 7, wherein the live ETG baccarat game includes a second physical card shoe with the result of hands from the first physical card shoe being displayed on one side of the first side of the community display and the result of hands from the second physical card shoe being displayed on another side of the first side of the community display.

9. The live ETG pit of claim 8, wherein the hands from the first card shoe and the hands from the second physical card shoe are dealt sequentially.

10. The live ETG pit of claim 1, wherein the plurality of live ETGs include a live ETG blackjack game have a physical card shoe with a single dealer console for a single dealer and the results of hands from the first card shoe being displayed on a first side of the community display.

11. The live ETG pit of claim 10, wherein displays of the player consoles are positioned between players and the single dealer such that the players cannot touch cards from the hands from the first card shoe as they are dealt.

12. The live ETG pit of claim 11, wherein the cards from the hands are dealt to areas on the live ETG blackjack game that correspond to each player among the players, wherein sensors in the areas read the cards and cause the cards to be displayed on the community display.

13. The live ETG pit of claim 12, wherein each of the displays of the player consoles include a graphical user interface that enables each player to place main game bets, see their cards and the single dealer's cards, place side bets, and resolve the results of each hand.

14. The live ETG pit of claim 1, wherein the one or more player consoles includes a plurality of player consoles arranged around one live ETG among of the plurality of live ETGs.

15. The live ETG pit of claim 14, wherein the plurality of player consoles are arranged around the one live ETG in a stadium configuration.

16. The live ETG pit of claim 1, wherein the one or more player consoles enable each player to play on two or more live ETGs at the same time.

17. The live ETG pit of claim 16, wherein the two or more live ETGs are physically located near the one or more player consoles.

18. The live ETG pit of claim 16, wherein one live ETG among the two or more live ETGs is physically located near the one or more player consoles and one or more live ETGs among the two or more live ETGs are remotely located.

19. The live ETG pit of claim 18, wherein at least one live ETG among the one or more live ETGs are in the live ETG pit.

20. A method for providing a live electronic table game (ETG) pit, comprising:

providing a plurality of live ETGs on a casino floor in a pit having an interior area and a perimeter, each live ETG having a physical game component involving one or more of a physical card, a physical ball, and a physical die, wherein at least part of each game played on each live ETG involves the physical game component, a community display, and at least one dealer console for enabling a dealer to manage various aspects of each game; and providing one or more player consoles around each of the plurality of live ETGs, each of the player consoles physically arranged around a live ETG having a graphical user interface for enabling a player to enter bets associated with each game to be played on the live ETG and to resolve the bets based on a result of each game.

* * * * *